(12) United States Patent
Wenzel et al.

(10) Patent No.: US 6,713,573 B2
(45) Date of Patent: *Mar. 30, 2004

(54) CATALYST MODIFIERS AND THEIR USE IN THE POLYMERIZATION OF OLEFIN(S)

(75) Inventors: Timothy T. Wenzel, Charleston, WV (US); Dick Alan Nagaki, South Charleston, WV (US); Thomas Henry Peterson, Charleston, WV (US); David James Schreck, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 151 days.

This patent is subject to a terminal disclaimer.

(21) Appl. No.: 09/726,704

(22) Filed: Nov. 30, 2000

(65) Prior Publication Data

US 2002/0099152 A1 Jul. 25, 2002

(51) Int. Cl.[7] .................. C08F 2/38; C08F 4/44
(52) U.S. Cl. .................. 526/89; 526/161; 526/172; 526/943; 526/901; 502/155
(58) Field of Search .................. 526/74, 89, 160, 526/161, 172, 943, 901; 502/152, 155

(56) References Cited

U.S. PATENT DOCUMENTS

| | | | |
|---|---|---|---|
| 3,995,097 A | 11/1976 | Brown et al. | 526/74 |
| 4,366,151 A | 12/1982 | Oppenlaener et al. | 424/238 |
| 4,425,464 A | 1/1984 | Allen et al. | 524/400 |
| 4,439,537 A | 3/1984 | Murai et al. | 502/105 |
| 4,513,095 A | 4/1985 | Speca | 502/111 |
| 4,564,647 A | 1/1986 | Hayashi et al. | 523/211 |
| 4,610,974 A | 9/1986 | Speca | 502/113 |
| 4,634,744 A | 1/1987 | Hwang et al. | 526/84 |
| 4,652,540 A | 3/1987 | Takahashi et al. | 502/108 |
| 4,942,147 A | 7/1990 | Karol et al. | 502/113 |
| 5,034,480 A | 7/1991 | Funk et al. | 526/74 |
| 5,034,481 A | 7/1991 | Funk et al. | 526/74 |
| 5,188,998 A | 2/1993 | Bueschges et al. | 502/107 |
| 5,362,823 A | 11/1994 | Karol et al. | 526/114 |
| 5,422,386 A | 6/1995 | Fries et al. | 523/344 |
| 5,459,217 A | 10/1995 | Todo et al. | 526/348.1 |
| 5,539,069 A | 7/1996 | Tsutsui et al. | 526/142 |
| 5,733,838 A | 3/1998 | Vicari et al. | 502/335 |
| 6,140,432 A | * 10/2000 | Agapiou et al. | 526/141 |
| 6,369,174 B1 | * 4/2002 | Wenzel et al. | 526/74 |

FOREIGN PATENT DOCUMENTS

| | | |
|---|---|---|
| EP | 0 071 252 B1 | 2/1983 |
| EP | 0 355 935 B1 | 2/1990 |
| EP | 0 374 619 A1 | 6/1990 |
| EP | 0 535 230 A1 | 4/1993 |
| EP | 0 630 910 A1 | 12/1994 |
| EP | 0 634 421 B1 | 1/1995 |
| EP | 0 638 595 B1 | 2/1995 |
| EP | 0 679 661 A1 | 11/1995 |
| EP | 0 745 607 A2 | 12/1996 |
| EP | 0 763 550 A1 | 3/1997 |
| EP | 0 768 319 A1 | 4/1997 |
| EP | 0 803 514 A1 | 10/1997 |
| EP | 0 829 491 A2 | 3/1998 |
| WO | WO 94/26793 | 11/1994 |
| WO | WO 96/32420 | 10/1996 |
| WO | WO 97/41161 | 11/1997 |
| WO | WO 97/47662 | 12/1997 |
| WO | WO 98/20045 | * 5/1998 |

* cited by examiner

Primary Examiner—Robert Deshon Harlan
(74) Attorney, Agent, or Firm—Jaimes Sher; Kevin M. Faulkner

(57) ABSTRACT

The present invention relates to the use of thermally triggered compounds that when used with a polymerization catalyst in a polymerization process results in the controllable generation of one or more catalyst inhibitors that renders the polymerization catalyst substantially or completely inactive.

13 Claims, No Drawings

CATALYST MODIFIERS AND THEIR USE IN THE POLYMERIZATION OF OLEFIN(S)

FIELD OF THE INVENTION

The present invention relates to a method for improving operability in a process for polymerizing olefin(s). In particular, the invention is directed to a method for controlling the kinetics of an olefin polymerization catalyst utilizing a thermally triggered compound that undergoes a chemical transformation into one or more catalyst inhibitor(s) that inactivate the polymerization catalyst.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes.

Especially illustrative of these advances is the development of technology utilizing bulky ligand metallocene catalyst systems. Regardless of these technological advances in the polyolefin industry, common problems, as well as new challenges associated with process operability still exist. For instance, the tendency for a gas phase or slurry phase process to foul and/or sheet remains a challenge using any olefin polymerization catalyst.

For example, in a continuous slurry process fouling on the walls of the reactor, which act as a heat transfer surface, can result in many operability problems. Poor heat transfer during polymerization can result in polymer particles adhering to the walls of the reactor. These polymer particles can continue to polymerize on the walls and can result in a premature reactor shutdown. Also, depending on the reactor conditions, some of the polymer may dissolve in the reactor diluent and redeposit on for example the metal heat exchanger surfaces.

In a typical continuous gas phase process, a recycle system is employed for many reasons including the removal of heat generated in the process by the polymerization. Fouling, sheeting and/or static generation in a continuous gas phase process can lead to the ineffective operation of various reactor systems. For example, the cooling mechanism of the recycle system, the temperature probes utilized for process control and the distributor plate, if affected, can lead to an early reactor shutdown.

Evidence of, and solutions to, various process operability problems have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; European Patent EP 0 634 421 B1 discusses introducing directly into the polymerization process water, alcohol and ketones to reduce fouling. A PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; WO 00/66637 discloses the use of a fatty amine to reduce fouling and sheeting; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene catalyst system and injecting antifoulants or antistatic agents into the reactor; controlling the polymerization rate, particularly on start-up; and reconfiguring the reactor design.

Others in the art to improve process operability have discussed modifying the catalyst system by preparing the catalyst system in different ways. For example, methods in the art include combining the catalyst system components in a particular order; manipulating the ratio of the various catalyst system components; varying the contact time and/or temperature when combining the components of a catalyst system; or simply adding various compounds to the catalyst system. These techniques or combinations thereof are discussed in the literature. Especially illustrative in the art is the preparation procedures and methods for producing bulky ligand metallocene catalyst systems, more particularly supported bulky ligand metallocene catalyst systems with reduced tendencies for fouling and better operability. Examples of these include: WO 96/11961 published Apr. 26, 1996 discusses as a component of a supported catalyst system an antistatic agent for reducing fouling and sheeting in a gas, slurry or liquid pool polymerization process; U.S. Pat. No. 5,283,218 is directed towards the prepolymerization of a metallocene catalyst; U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat.

No. 5,492,975 discusses polymer bound metallocene catalyst systems; U.S. Pat. No. 5,661,095 discusses supporting a metallocene catalyst on a copolymer of an olefin and an unsaturated silane; PCT publication WO 97/06186 published Feb. 20, 1997 teaches removing inorganic and organic impurities after formation of the metallocene catalyst itself; PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 638 discusses using a metallocene catalyst and an activating cocatalyst in a polymerization process in the presence of a nitrogen containing antistatic agent.

U.S. Pat. Nos. 4,942,147 and 5,362,823 discuss the addition of autoacceleration inhibitors to prevent sheeting. WO 00/35969 discusses the use of an acid and a base with a polymerization catalyst that react at a certain temperature to form a catalyst poison. WO 00/35967 discloses the use of a solid polar compound, whose melting point is above the normal reactor temperature but below the melting point of the polymer, which melts without decomposition or a chemical transformation and poisons the catalyst should overheating occur. While all these possible solutions might reduce the level of fouling or sheeting somewhat, some are expensive to employ and/or may not reduce fouling and sheeting to a level sufficient to successfully operate a continuous process, particularly a commercial or large-scale process.

Thus, it would be advantageous to have a polymerization process capable of operating continuously with enhanced reactor operability and at the same time produce new and improved polymers. It would also be highly beneficial to have a continuously operating polymerization process having more stable catalyst productivities, reduced fouling/sheeting tendencies and increased duration of operation.

SUMMARY OF THE INVENTION

This invention provides a method of making a new and improved catalyst composition, the catalyst composition itself and its use in a polymerizing process. Also, the invention is directed to the use of a thermally triggered compound that in the presence of a polymerization catalyst reacts at a specified temperature during a polymerization process to release at least one compound that is a catalyst inhibitor, either a gas or a liquid, preferably a gas. The most preferred thermally triggered compounds are solid beta-keto acids, specifically a beta-keto carboxylic acid that melts between about 80° C. to about 120° C. and has a weight loss of greater than or equal to 5 weight percent at about 110° C. to less than or equal to 0.02 weight percent at about 80° C. using a standard thermogravimetric analysis (TGA) at 80° C. or 110° C. for 20 minutes.

The method for preparing the catalyst composition comprises the step of combining, contacting, blending and/or mixing any catalyst system, preferably a supported catalyst system, with the thermally triggered compound such that at a specified temperature the thermally triggered compound reacts to form at least one catalyst inhibitor, preferably two catalyst inhibitors both of which are either gasses or liquids, preferably at least one is a gas and at least one is a liquid, that deactivates the catalyst composition. In the most preferred embodiment, the solid, thermally triggered compounds react at a temperature above the polymerization temperature, reactor temperature, to form the two or more catalyst inhibitors, more preferably a gaseous catalyst inhibitor and a liquid catalyst inhibitor. In one embodiment, the catalyst system comprises a conventional-type transition metal catalyst compound. In the most preferred embodiment the catalyst composition comprises a bulky ligand metallocene catalyst compound. The combination or use of an olefin polymerization catalyst and a thermally triggered compound is useful in any olefin polymerization process. The preferred polymerization processes are a gas phase or a slurry phase process, most preferably a gas phase process.

In another preferred embodiment, the invention provides for a process for polymerizing olefin(s) in the presence of a polymerization catalyst and a thermally triggered compound in a reactor at an operating temperature, wherein the thermally triggered compound chemically changes or transforms at a temperature above the operating temperature to form at least one catalyst inhibitor, preferably at least two catalyst inhibitors that reduce the effectiveness of the polymerization catalyst to polymerize olefin(s). In the most preferred embodiment, the catalyst inhibitors render the polymerization catalyst inactive and the catalyst inhibitors comprise a gaseous catalyst inhibitor and a liquid catalyst inhibitor.

DETAILED DESCRIPTION OF THE INVENTION

Introduction

The invention is directed toward a method for making a catalyst composition and to the catalyst composition itself. The invention also relates to a polymerization process having improved operability using the catalyst composition. While not being bound to any particular theory, it is believed that one possible cause for reduced operability, especially sheeting and/or fouling, is the result of a catalyst's tendency to continue to polymerize well after its initial activation. It has been suprisingly discovered that using a thermally triggered compound that chemical transforms into one or more catalyst inhibitors, preferably two catalyst inhibitors, one gas and one liquid, in combination with a polymerization catalyst, results in the ability to control the catalyst's tendency for continuing to effectively polymerize olefin(s). It has also been discovered that the chemical transformation forming the catalyst inhibitors is controllable. For example, the thermally triggered compound will essentially remain unchanged during normal operating temperatures, but as soon as catalyst particle becomes overheated, the compound transforms into one or more catalyst inhibitors that kills the polymerization catalyst fairly quickly. Without being bound to any particular theory, it is believed that this may mean that the thermally triggered compounds must have a high activation energy $E_a$ for the reaction of the catalyst inhibitors to the overheated polymerization catalyst, especially for achieving a particular temperature sensitivity. However, a high $E_a$ typically tends toward a slower rate of reaction, thus more of the thermally triggered compound is required. Surprisingly, the thermally triggered compounds of the present invention provide both a high Ea and a fast rate. It would be within the skill in the art using the Arrhenius equation to predict thermally triggered compounds for use at a particular temperature range. The present invention is useful in all types of polymerization processes, especially a slurry or gas phase process.

Catalyst Components and Catalyst Systems

All polymerization catalysts including conventional-type transition metal catalysts and bulky ligand metallocene catalysts are suitable for use in the polymerizing process of the invention. The following is a non-limiting discussion of the various polymerization catalysts useful in the invention.

Conventional-type Transition Metal Catalysts

Conventional-type transition metal catalysts are those traditional Ziegler-Natta catalysts and Phillips-type catalysts well known in the art. Examples of conventional-type transition metal catalysts are discussed in U.S. Pat. Nos. 4,115,639, 4,077,904, 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_5)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Pat. Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below.

Conventional-type Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Bulky Ligand Metallocene Catalyst Compounds

Generally, bulky ligand metallocene catalyst compounds include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B MQ_n \quad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene catalyst compound.

In one embodiment, the bulky ligand metallocene catalyst compounds of the invention include those of formula (I) where $L^A$ and $L^B$ are bridged to each other by a bridging group, A, such that the formula is represented by $$L^A A L^B MQ_n \quad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363 and 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^c AJMQ_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^c$ is a substituted or unsubstituted bulky ligand bonded to M; J is bonded to M; A is bonded to $L^c$ and J; J is a heteroatom ancillary ligand; and A is a bridging group; Q is a univalent anionic ligand; and n is the integer 0,1 or 2. In formula (III) above, $L_c$, A and J form a fused ring system. In an embodiment, $L^c$ of formula (III) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D MQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a uncharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-AL-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In one embodiment, the bulky ligand metallocene catalyst compound is represented by the formula:

$$((Z)XA_t(YJ))_q MQ_n \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene Catalyst Compounds

It is within the scope of this invention, in one embodiment, that the bulky ligand metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene catalysts are those Group 5 and 6 metal imido complexes described in EP-A2-0 816 384 and U.S. Pat. No. 5,851,945, which is incorporated herein by reference. In addition, bulky ligand metallocene catalysts include bridged bis(arylamido) Group 4 compounds described by D. H. McConville, et al., in Organometallics 1195, 14, 5478–5480, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Activator and Activation Methods for the Bulky Ligand Metallocene Catalyst Compounds The above described bulky ligand metallocene catalyst compounds are typically activated in various ways to yield catalyst compounds having a vacant coordination site that will coordinate, insert, and polymerize olefin(s), an activated polymerization catalyst.

For the purposes of this patent specification and appended claims, the term "activator" is defined to be any compound or component or method which can activate any of the bulky ligand metallocene catalyst compounds of the invention as described above. Non-limiting activators, for example may include a Bronsted acid or a non-coordinating ionic activator or ionizing activator or any other compound including Bronsted bases, aluminum alkyls, conventional-type cocatalysts and combinations thereof that can convert a neutral bulky ligand metallocene catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene catalyst compound.

In one embodiment, an activation method using ionizing ionic compounds not containing an active proton but capable of producing both a bulky ligand metallocene catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166 and 5,856,256 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include triethylaluminum, triisobutylaluminum, trimethylaluminum, tri-n-hexyl aluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B 1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. Other activators include aluminum/boron complexes as described in EP 608 830 B1, which is herein incorporated by reference. WO 98/09996 incorporated herein by reference describes activating bulky ligand metallocene catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene catalyst compound. EP-B 1-0 781 299 describes using a silylium salt in combination with a non-coordinating compatible anion. Also, methods of activation such as using radiation (see EP-B 1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and PCT WO 98/32775, which are herein incorporated by reference.

It is also within the scope of this invention that the above described bulky ligand metallocene catalyst compounds can be combined with one or more of the catalyst compounds represented by formulas (I) through (V) with one or more activators or activation methods described above.

It is further contemplated by the invention that other catalysts can be combined with the bulky ligand metallocene catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene catalyst compounds of the invention have at least one fluoride or fluorine containing leaving group as described in U.S. application Ser. No. 09/191,916 filed Nov. 13, 1998.

In another embodiment of the invention one or more bulky ligand metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Supports, Carriers and General Supporting Techniques

The above described conventional-type transition metal catalyst compounds and catalyst systems and bulky ligand metallocene catalyst compounds, activators, cocatalysts and/or catalyst systems may be combined with one or more support materials or carriers using one of the support methods well known in the art or as described below. For example, in a most preferred embodiment, a bulky ligand metallocene catalyst compound, an activator or catalyst system is in a supported form, for example deposited on, contacted with, vapourized with, bonded to, or incorporated within, adsorbed or absorbed in, or on, a support or carrier.

The terms "support" or "carrier" are used interchangeably and are any support material, preferably a porous support material, more preferably an inorganic support or an organic support. Inorganic supports are preferred for example inorganic oxides and inorganic chlorides. Other carriers include resinous support materials such as polystyrene, functionalized or crosslinked organic supports, such as polystyrene divinyl benzene polyolefins or polymeric compounds, zeolites, clays, talc, or any other organic or inorganic support material and the like, or mixtures thereof. The most preferred carriers are inorganic oxides that include those Group 2, 3, 4, 5, 13 or 14 metal oxides. The preferred supports include silica, alumina, silica-alumina, magnesium chloride, and mixtures thereof.

Other useful supports include magnesia, titania, zirconia, montmorillonite (EP-B1 0 511 665) and the like. Also, combinations of these support materials may be used, for example, silica-chromium, silica-alumina, silica-titania and the like.

It is preferred that the carrier, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the carrier is in the range of from about 50 to about 500 m$^2$/g, pore volume of from about 0.5 to about 3.5 cc/g and average particle size of from about 10 to about 200 μm. Most preferably the surface area of the carrier is in the range is from about 100 to about 400 m$^2$/g, pore volume from about 0.8 to about 3.0 cc/g and average particle size is from about 5 to about 100 μm. The average pore size of the carrier of the invention typically has pore size in the range of from 10 to 1000 Å, preferably 50 to about 500 Å, and most preferably 75 to about 350 Å.

Examples of supporting the bulky ligand metallocene catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664 and 5,846,895 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297, and EP-B1-0 685 494 all of which are herein fully incorporated by reference. Examples of supporting conventional-type transition metal catalyst compounds are also well known in the art.

There are various other methods in the art for supporting a polymerization catalyst compound or catalyst system of the invention. For example, the bulky ligand metallocene catalyst compound of the invention may contain a polymer bound ligand as described in U.S. Pat. Nos. 5,473,202 and 5,770,755, which is herein fully incorporated by reference; the bulky ligand metallocene catalyst system of the invention may be spray dried as described in U.S. Pat. No. 5,648,310, which is herein fully incorporated by reference; the support used with the bulky ligand metallocene catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported bulky ligand metallocene catalyst system that includes an antistatic agent or surface modifier that is used in the preparation of the supported catalyst system as described in PCT publication WO 96/11960, which is herein fully incorporated by reference. The catalyst systems of the invention can be prepared in the presence of an olefin, for example hexene-1.

In another embodiment, the bulky ligand metallocene catalyst system can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

A preferred method for producing the supported bulky ligand metallocene catalyst system of the invention is described below and is described in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the bulky ligand metallocene catalyst compound is slurried in a liquid to form a metallocene solution and a separate solution is formed containing an activator and a liquid. The liquid may be any compatible solvent or other liquid capable of forming a solution or the like with the bulky ligand metallocene catalyst compounds and/or activator of the invention. In the most preferred embodiment the liquid is a cyclic aliphatic or aromatic hydrocarbon, most preferably toluene. The bulky ligand metallocene catalyst compound and activator solutions are mixed together and added to a porous support or the porous support is added to the solutions such that the total volume of the bulky ligand metallocene catalyst compound solution and the activator solution or the bulky ligand metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the supported bulky ligand metallocene catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the bulky ligand metallocene catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the conventional-type transition metal catalyst system and/or a bulky ligand metallocene catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference. In this embodiment, the prepolymerization is either in the presence of the thermally triggered compound that is added after the prepolymerization, but prior to the main polymerization, or simply added to the reactor with a already formed prepolymerized catalyst or a combination thereof. For the purposes of this patent specification and appended claims only, prepolymerization is considered a method for immobilizing a catalyst system and therefore considered to form a supported catalyst system.

Compound Combinations

There are various compounds that can be used to form a catalyst inhibitor to control the kinetics of an olefin polymerization catalyst. In the preferred embodiment, the invention relates to the use a thermally triggered compound in the presence of a polymerization catalyst that chemically changes at a specified temperature during a polymerization process to release one or more catalyst inhibitors, preferably one gas and one liquid catalyst inhibitors. In one embodiment, the triggered compound has a weight loss under standard operating conditions of no greater than 10 weight percent, preferably less than 1 weight percent, more preferably less than 0.1 weight percent, even more preferably less than 0.05 weight percent and most preferably less than 0.01 weight percent measured using a standard thermogravimetric analysis (TGA) at 80° C. for 20 minutes.

Yet at higher temperatures, substantial weight loss is observed, due to decomposition of the thermally triggered compound. The rate of weight loss at 130° C. must be at least 10 times as high as at 80° C., preferably at least 100 times as high, more preferably at least 250 times as high, and even more preferably at least 500 times as high, and most preferably at least 1000 times as high. In another embodiment of the invention the solid thermally triggered compound has a melting temperature in the range of from 0° C. to 200° C., preferably from 10° C. to 180° C., more preferably from 40° C. to 150° C., and most preferably from 80° C. to 130° C. The most preferred thermally triggered compounds release gaseous or substantially volatile catalyst inhibitors that poison the catalyst. Non-limiting examples of common volatile or gaseous catalyst inhibitors include carbon monoxide, carbon dioxide, water, ammonia, methanol, formaldehyde, acetone, dimethyl ether, cyclopentadiene and formic acid. Non-limiting examples of liquid catalyst inhibitors include ketones, aldehydes, alcohols, amines, carboxylic acids and esters.

In one embodiment two or more of the gaseous or liquid catalyst inhibitors or a combination thereof are chemically formed from a single thermally triggered compound.

Non-limiting examples of thermally triggered compounds include beta-keto carboxylic acids, Diels-Alder adducts, metal carbonyl complexes, metal carbonates, hydrate complexes, clathrate complexes, peroxides, percarboxylic acids, azo compounds, diazonium complexes and sulfones. Identification of potential candidates is easily achieved by scanning common repositories of chemical information, such as Beilstein, for example melting point information. Decomposition on melting, if it occurs, is usually indicated. By decomposition it is meant that the thermally triggered compound undergoes a chemical change.

In one embodiment, the thermally triggered compound has a melting point in the range of from 50° C. to about 130° C., preferably in the range of from about 60° C. to about 120° C., more preferably in the range of from 70° C. to about 110° C., and most preferably in the range of from 80° C. to about 105° C.

In another embodiment, the thermally triggered compound has a melting point greater than 60° C., preferably greater than 70° C., more preferably greater than 75° C., and most preferably greater than 80° C.

In an embodiment, the thermally triggered compound are solids in the temperature range of from 25° C. to normal reaction conditions of temperature in the reactor during polymerization. Normal polymerization temperatures vary depending on the process used and/or the polymer produced. Typically polymerization temperatures in a gas phase process are in the range of 50° C. to about 120° C., more preferably from about 60° C. to about 110° C., most preferably from about 65° C. to about 100° C. Other polymerization temperatures are discussed later in this patent specification. In addition, in one embodiment, the thermally triggered compounds chemically transform into at least one, preferably two or more catalyst inhibitors at a temperature that is greater than 5° C. above the polymerization temperature.

The most preferred thermally triggered compounds include 4-p-hydroxyphenyl-2,2,4-trimethylthiachroman methanol clathrate that chemically transforms into methanol and 4-p-hydroxyphenyl-2,2,4-trimethylthiachroman; 2-pivaloypropionic acid that chemically transforms into carbon dioxide ($CO_2$) and ketone; 2-pivaloysuccinic acid that chemically transforms into carbon dioxide and ketone/ carboxylic acid; benzoyl peroxide that chemically transforms into carbon dioxide, benzene, benzoic acid and biphenyl among others; other clathrate complexes that melt and decompose between 60° C. and 130° C.; other beta-keto carboxylic acids that melt and decompose between 60° C. and 130° C.; other organic peroxides melt and decompose between 60° C. and 130° C.; and various azobisorganonitriles that melt and decompose between 60° C. and 130° C. into nitrogen and a liquid organic nitrile or other polar compound, preferably containing a heteroatom.

Methods for Using the Combination of Compounds

The use of the thermally triggered compound(s) of the invention can vary. For example, the thermally triggered compounds can be added or introduced with or without a catalyst directly to a polymerization process. The thermally triggered compounds may be combined prior to introducing them to a polymerization process, or the thermally triggered compounds may be added separately and/or simultaneously to the reactor. In an embodiment, the thermally triggered compounds are contacted with a catalyst compound prior to being introduced to the reactor. Other embodiments may include placing the thermally triggered compounds on a support material and then introducing the support material to the polymerization reactor, slurrying them in mineral oil and adding to the reactor separately as a slurry, or adding the solids directly to the reactor.

The thermally triggered compounds may be introduced in one embodiment in the recycle stream of a gas phase polymerization process or below the distributor plate or in a region within the reactor where the tendency for sheeting to occur is high. The details of a gas phase polymerization process is discussed later in this patent specification.

In yet another embodiment, the thermally triggered compounds are used in combination with an unsupported catalyst system.

In the most preferred embodiment, thermally triggered compounds are used with a supported catalyst system. A most preferred method for making a supported catalyst system of the invention generally involves the combining, contacting, blending, bonding and/or mixing any of the above described catalyst compounds, preferably a bulky ligand metallocene catalyst compound, using any of the techniques previously described.

In one embodiment of the method of the invention, a catalyst compound is combined, contacted, bonded, blended, and/or mixed with a thermally triggered compounds. In a most preferred embodiment, the catalyst compound is a conventional-type transition metal catalyst and/or a bulky ligand metallocene catalyst supported on a carrier. In one embodiment, thermally triggered compounds are in a mineral oil slurry with or without a catalyst system, preferably with a supported catalyst system that is introduced to a polymerization process.

In another embodiment, the steps of the method of the invention include forming a polymerization catalyst, preferably forming a supported polymerization catalyst, and contacting the polymerization catalyst, preferably the supported polymerization catalyst with a thermally triggered compound. In a preferred method, the polymerization catalyst comprises a catalyst compound, an activator and a carrier, preferably the polymerization catalyst is a supported bulky ligand metallocene catalyst.

In one embodiment of the method of the invention, thermally triggered compounds, are contacted with the catalyst system, preferably a supported catalyst system, most preferably a supported bulky ligand metallocene catalyst system under ambient temperatures and pressures. Preferably the contact temperature for combining the polymerization catalyst and the thermally triggered compounds is in the range of from 0° C. to about 100° C., more preferably from 15° C. to about 75° C., most preferably at about ambient temperature and pressure.

In a preferred embodiment, the contacting of the polymerization catalyst and the thermally triggered compounds is performed under an inert gaseous atmosphere, such as nitrogen. However, it is contemplated that the combination of the polymerization catalyst and the thermally triggered compounds may be performed in the presence of olefin(s), solvents, hydrogen and the like.

In one embodiment, the thermally triggered compounds may be added at any stage during the preparation. It is understood by those in the art that in choosing a thermally triggered compound for example, that the compound does not chemically transform during preparation of supported catalyst system.

In one embodiment of the method of the invention, the polymerization catalyst and a thermally triggered compound are combined in the presence of a liquid, for example the liquid may be a mineral oil, toluene, hexane, isobutane or a mixture thereof. Ideally, the thermally triggered compound is largely insoluble in the liquid. In a more preferred method the thermally triggered compound is combined with a polymerization catalyst that has been formed in a liquid, preferably in a slurry, or combined with a substantially dry or dried, polymerization catalyst that has been placed in a liquid and reslurried.

Preferably, prior to use, the polymerization catalyst is contacted with the thermally triggered compound for a period of time greater than a second, preferably from about 1 minute to about 48 hours, more preferably from about 10 minutes to about 10 hours, and most preferably from about 30 minutes to about 6 hours. The period of contacting refers to the mixing time only.

In an embodiment, the mole ratio of the thermally triggered compounds to the metal of the polymerization catalyst is the range from 5000 to about 0.2, preferably from about 1000 to about 0.5, more preferably from about 500 to about 1, and most preferably from about 250 to about 1.

In another embodiment, the weight ratio of the thermally triggered compound to the weight of the polymerization catalyst (including support if a supported polymerization catalyst) is the range from 100 to 0.001, preferably from about 10 to about 0.01, more preferably from 5 to 0.1, and most preferably from 2 to about 0.2.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment for combining, a solid polymerization catalyst and thermally triggered compound include a ribbon blender, a static mixer, a double cone blender, a drum tumbler, a drum roller, a dehydrator, a fluidized bed, a helical mixer and a conical screw mixer.

In a preferred embodiment of the invention a catalyst system is supported on a carrier, preferably the supported catalyst system is substantially dried, preformed, substantially dry and/or free flowing. In an especially preferred method of the invention, the preformed supported catalyst system is contacted with at least one thermally triggered compound. The thermally triggered compound may be in solution or slurry or in a dry state, preferably in a dry or dried state.

In an embodiment, the method of the invention provides for co-injecting an unsupported polymerization catalyst and the thermally triggered compound into the reactor. In one embodiment the polymerization catalyst is used in the unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with thermally triggered compound together or separately to a reactor using the injection methods described in PCT publication WO 97/46599, which is fully incorporated herein by reference. Where an unsupported bulky ligand metallocene catalyst system is used the mole ratio of the metal of the activator component to the metal of the bulky ligand metallocene catalyst compound is in the range of between 0.3:1 to 10,000:1, preferably 100:1 to 5000:1, and most preferably 500:1 to 2000:1.

In one embodiment, the polymerization catalyst has a productivity greater than 1500 grams of polymer per gram of catalyst, preferably greater than 2000 grams of polymer per gram of catalyst, more preferably greater than 2500 grams of polymer per gram of catalyst and most preferably greater than 3000 grams of polymer per gram of catalyst. In one embodiment, when the thermally triggered compound of the invention, react to form one or more, preferably two or more catalyst inhibitors, the polymerization catalyst productivity is reduced to less than 1500 grams of polymer per gram of catalyst, preferably less than 1000 grams of polymer per gram of catalyst, more preferably less than 500 grams of polymer per gram of catalyst, even more preferably less than 100 grams of polymer per gram of catalyst, and still even more preferably less than 25 grams of polymer per gram of catalyst and most preferably to less than is measurably possible or 0 grams of polymer per gram of catalyst.

Polymerization Process

The catalyst system including the thermally triggered compound of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C. For purposes of this patent specification and appended claims the terms "polymerization temperature" and "reactor temperature" are interchangeable.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B 1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed. In such slurry polymerizations, it is preferred that the thermally triggered compound be largely insoluble in the medium.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Product of the Invention

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 30, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65.

In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like. Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The polymerization catalyst used in the examples below was prepared similarly to the following preparation. The bridged, bulky ligand metallocene catalyst compound was dimethylsilyl-bis(tetrahydroindenyl)zirconium dichloride ($Me_2Si(H_4Ind)_2ZrCl_2$) available from Albemarle Corporation, Baton Rouge, La. The ($Me_2Si(H_4Ind)_2ZrCl_2$) catalyst compound was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

The first step in the manufacture of the supported bulky ligand metallocene catalyst above involves forming a precursor solution. 460 lbs (209 kg) of sparged and dried toluene is added to an agitated reactor after which 1060 lbs (482 kg) of a 30 weight percent methylaluminoxane (MAO) in toluene (available from Albemarle, Baton Rouge, La.) is added. 947 lbs (430 kg) of a 2 weight percent toluene solution of a dimethylsilyl-bis(tetrahydroindenyl) zirconium dichloride catalyst compound and 600 lbs (272 kg) of additional toluene are introduced into the reactor. The precursor solution is then stirred at 80° F. to 100° F. (26.7° C. to 37.8° C.) for one hour.

While stirring the above precursor solution, 850 lbs (386 kg) of 600° C. Crosfield dehydrated silica carrier is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl) octadecylamine (($C_{18}H_{37}N(CH_2CH_2OH)_2$) available as Kemamine AS-990 from Witco Corporation, Memphis, Tennessee, is added together with an additional 110 lbs (50 kg) of a toluene rinse and the reactor contents then is mixed for 30 min. while heating to 175° F. (79° C.). After 30 min. vacuum is applied and the polymerization catalyst mixture dried at 175° F. (79° C.) for about 15 hours to a free flowing powder. The final polymerization catalyst weight was 1200 lbs (544 kg) and had a Zr wt % of 0.35 and an Al wt % of 12.0.

Example 1

Synthesis of 4-p-hydroxyphenyl-2,2,4-trimethylthiachroman

The compound "MeOH Clathrate" is 4-p-hydroxyphenyl-2,2,4-trimethylthiachroman methanol hydrate. It was synthesized by the method outlined by MacNicol, D. D. *Chem. Communications* 1969, 836.

Example 2

Synthesis of 2-Pivaloylpropionic Acid

Ethyl 2-pivaloylpropionate. A 500 mL 3-neck round-bottom flask was equipped with a reflux condensor and thermometer and purged with nitrogen. To it was charged 100 mL dry, deoxygenated diethyl ether and 4.4 g of zinc strips. This mixture was agitated in a water-filled sonicating bath for 5 minutes. To this was slowly added a mixture of 12.06 g pivaloyl chloride (0.10 mole), 18.1 g of ethyl 2-bromopropionate (0.10 mole, synthesized by the method of Strunk, R. J.; DiGiacomo, P. M.; Aso, K.; Kuivila, H. G. *J Am. Chem. Soc.*, 1970, 92, 2849–2856.) and 100 mL of ethyl ether. The resulting mixture was refluxed 6 hours and stirred at room temperature overnight. The mixture was then successively extracted with cold 20% aqueous sulfuric acid, water and brine before drying over sodium sulfate. The solution was stripped to obtain 12.8 g of crude oil. This was distilled under vacuum to yield 10.5 g of ethyl 2-pivaloylpropionate. $^1H$ NMR ($CDCl_3$): δ4.103 (q, J=7.1 Hz, 2H), 3.959 (q, J=6.9, 1 Hz), 1.287 (d, J=7.0 Hz, 3H), 1.196 (t, J=7.1 Hz, 3H), 1.157 (s, 9H).

2-Pivaloylpropionic acid. A 5 g portion of ethyl 2-pivaloylpropionate was stirred with 1M aqueous lithium hydroxide overnight. After acidification with 37% hydrochloric acid, the mixture was extracted with ether. The organic extracts were washed with water and then brine to yield 3.5 g of solid. Recrystallization from pentane yielded 2.0 g of pure 2-pivaloylpropionic acid. M.P.: 100–102° C. (decomp.). $^1H$ NMR ($CDCl_3$): δ4.024 (q, J=7.0 Hz, 1H), 1.316 (d, J=7.0 Hz, 3H), 1.177 (s, 9H).

Example 3

Synthesis of 2-Pivaloylsuccinic Acid

Ethyl 2-pivaloylsuccinate. A 500 mL 3-neck round-bottom flask was equipped with a reflux condensor and thermometer and purged with nitrogen. To it was charged 100 mL dry, deoxygenated diethyl ether and 4.4 g of zinc strips. This mixture was agitated in a water-filled sonicating bath for 5 minutes. To this was slowly added a mixture of 8.0 g of pivaloyl chloride (0.066 mole), 14.0 g of 2-bromosuccinic acid (0.061 mole, synthesized by the method of Fenton *J. Chem. Soc.* 1898, 72–73.) and 100 mL of ethyl ether. The resulting mixture was refluxed 6 hours and stirred at room temperature overnight. The mixture was then successively extracted with cold 20% aqueous sulfuric acid, water and brine before drying over sodium sulfate. The solution was stripped to obtain 14.6 g of crude oil. This was distilled under vacuum to yield 12.1 g of ethyl 2-pivaloylsuccinate. $^1H$ NMR ($CDCl_3$): δ4.341 (q, J=7.3 Hz, 1H), 4.116 (q, J=7.1 Hz, 2H), 4.082 (q, J=7.3 Hz, 2H), 2.792 (d, J=7.2 Hz, 2H), 1.204 (t, J=7.2 Hz, 3H), 1.203 (t, J=7.1 Hz, 3H), 1.177 (s, 9H).

2-Pivaloylsuccinic acid. A 3.5 g portion of ethyl 2-pivaloylsuccinate was stirred with 1 M aqueous lithium hydroxide overnight. After acidification with 37% hydrochloric acid, the mixture was extracted with ether. The organic extracts were washed with water and then brine to yield 1.5 g of solid. Recrystallization from pentane/diethyl ether yielded 1.0 g of pure 2-pivaloylsuccinic acid. M.P.: 115° C. (decomp.). $^1$H NMR (CDCl$_3$): δ4.229 (t, J=7.3 Hz, 1H), 2.694 (dd, J=17.2, 6.6 Hz, 1H), 2.670 (dd, J=17.2, 7.7 Hz, 1H), 1.093 (s, 9H).

Polymerization Process

A one liter 316 Stainless Steel (SS) reactor with air-operated helical stirrer and an outer steam-heated shell and a inner acetone heat-transfer shell was dried by heating to 115° C. while purging with 500 sccm of nitrogen for 30 minutes. After cooling to 90° C., it was charged with 100 g of polyethylene (granular Union Carbide grade DSX4810 (available from Union Carbide Corporation, Danbury, Conn.), Cr-based, 0.948 density, I$_{10}$=10, unstabilized) under inert conditions. A catalyst charging vessel comprising a ¼ inch (0.64 cm)×2" (5 cm) stainless steel tube isolated between two ball valves, charged with 60 mg supported polymerization catalyst (2 μmol zirconium) in a drybox, was attached to the reactor against a nitrogen purge. A similar vessel containing the thermally triggered compound (if any) was attached in the same way. The reactor was then pressure/vented four times with 100 psi (690 kPa) nitrogen. A solution of 100 micromoles of tri-isobutylaluminum (TIBA) was then added and the reactor sealed and pressure/vented three times with 100 psi (690 kPa) ethylene before bringing the reactor to reactor conditions, 107 psi (738 kPa) and 60, 80 or 90° C. as detailed below.

When the reactor stabilized, the catalyst was injected. Thermally triggered compound, if any, was injected at 20 minutes. After 38 minutes the temperature was ramped to 100° C. during 5 minutes and held for 40 minutes. The ideal thermally triggered compound for purposes of these experiments below will have little effect on the catalyst activity at the initial temperature but will substantially reduce catalyst activity at the higher temperature.

minutes during the 80° C. segment of the run. Table 1 illustrates that catalyst activity is substantially reduced at the higher temperature range.

Example 9

As in Example 8 above except that 10.2 mg of 2-pivaloylsuccinic acid was used in place of diketosuccinic acid. Table 1 illustrates that catalyst activity is substantially reduced at the higher temperature range.

Example 10

As in Example 8 above except that 8.4 mg of 2-pivaloylsuccinic acid was used in place of diketosuccinic acid. Table 1 illustrates that catalyst activity is substantially reduced at the higher temperature range.

Example 11

As in Example 8 above except that 1.8 mg of 2-pivaloylsuccinic acid was used in place of diketosuccinic acid. Table 1 illustrates that catalyst activity is substantially reduced at the higher temperature range.

Example 12

As in Example 8 above except that 10.2 mg of 2-pivaloylpropionic acid was used in place of diketosuccinic acid. Table 1 illustrates that catalyst activity is substantially reduced at the higher temperature range.

Example 13

As in Example 8 above except that 32 mg of clathrate complex from Example 1 was used in place of diketosuccinic acid. Table 1 illustrates that catalyst activity is substantially reduced at the higher temperature range.

TABLE 1

| Example | Thermally Triggered Inhbitor | Activity[1] | (g) uptake 80° C. | (g) uptake 100° C. | uptake 100° C./80° C. |
|---|---|---|---|---|---|
| CEX. 4 | None | 14990 | 16.5 | 36.9 | 2.23 |
| CEX. 5 | None | 13484 | 17.0 | 38.6 | 2.27 |
| CEX. 6 | None | 12584 | 15.4 | 30.4 | 1.98 |
| CEX. 7 | None | 13216 | 13.6 | 28.0 | 2.06 |
| 8 | 4.8 mg diketosuccinic acid | 6022 | 13.4 | 9.2 | 0.69 |
| 9 | 10.2 mg 2-pivaloylsuccinic acid | 1686 | 9.5 | 3.0 | 0.32 |
| 10 | 8.4 mg 2-pivaloylsuccinic acid | 2411 | 6.8 | 1.7 | 0.25 |
| 11 | 1.8 mg 2-pivaloylsuccinic acid | 7182 | 13.2 | 11.6 | 0.88 |
| 12 | 10.2 mg 2-pivaloylpropionic acid | 3983 | 11.7 | 7.3 | 0.62 |
| 13 | 32 mg MeOH clathrate | 6262 | 10.4 | 10.7 | 1.03 |

[1]Activity is measured as grams of polyethylene/mmol Zr/hour/100 psi (690 kPa) ethylene Comparative Examples 4 to 7 (CEX. 4 to 7)
Control Experiments These Comparative Examples 4 to 7 are control experiments, where no thermally triggered compound was used with the polymerization catalyst. Table 1 illustrates that without the thermally triggered compound, catalyst activity is substantially higher at the higher temperature range, 100° C. in these examples.

Example 8

4.8 mg of diketosuccinic acid was charged to the catalyst charging vessel and injected with nitrogen pressure at 20

Comparative Examples 14 to 16 (CEX. 14 to 16)

Control Experiments

These Comparative Examples 14 to 16 are control experiments, where no thermally triggered compound was used with the polymerization catalyst and run like those in Comparative Examples 4 to 7 except that the temperature range spans 90° C. to 110° C. Table 2 illustrates that without the thermally triggered compound, catalyst activity is substantially higher at the higher temperature range, 110° C. in these examples.

Example 17

As in Example 8 above except that 4.5 mg of diketosuccinic acid was used at a temperature range of 90 to 110° C. Table 2 illustrates that catalyst activity is substantially reduced at the higher temperature range.

Example 18

As in Example 8 above except that 1.7 mg of diketosuccinic acid was used at a temperature range of 90 to 110° C. Table 2 illustrates that catalyst activity is substantially reduced at the higher temperature range.

TABLE 2

| Example | Thermally Triggered Inhibitor | Activity[1] | (g) uptake 90° C. | (g) uptake 110° C. | Uptake 110° C./90° C. |
|---|---|---|---|---|---|
| CEX. 14 | None | 16009 | 29.3 | 33.1 | 1.13 |
| CEX. 15 | None | 16151 | 30.3 | 28.4 | 0.94 |
| CEX. 16 | None | 15981 | 28.1 | 29.5 | 1.05 |
| 17 | 4.5 mg diketosuccinic acid | 6050 | 18.2 | 4.6 | 0.25 |
| 18 | 1.7 mg diketosuccinic acid | 8484 | 23.1 | 14.4 | 0.62 |

[1]Activity is measured as grams of polyethylene/mmol Zr/hour/100 psi (690 kPa) ethylene

Comparative Examples 19 to 21
Control Experiments

These Comparative Examples 19 to 21 are control experiments, where no thermally triggered compound was used with the polymerization catalyst, and were run like those in Comparative Examples 4 to 7 above except that the temperature range spans 60° C. to 100° C. Table 3 illustrates that without the control agent, catalyst activity is substantially higher at the higher temperature range, 100° C. in these examples.

Examples 22 to 23

As in Example 8 above, except that 6 mg of benzoyl peroxide was used in place of the diketosuccinic acid, and the temperature range was 40° C. to 100° C. Table 3 illustrates that catalyst activity is substantially reduced at the higher temperature range.

TABLE 3

| Example | control agent | umol Zr | Activity[1] | (g) uptake 60° C. | (g) uptake 100° C. | Uptake 100° C./60° C. |
|---|---|---|---|---|---|---|
| 19 | control | 4.1 | 6644 | 6.5 | 39.9 | 6.15 |
| 20 | control | 3.1 | 6374 | 3.7 | 29.8 | 8.08 |
| 21 | control | 3.0 | 4147 | 3.3 | 18.0 | 5.40 |
| 22 | 6 mg benzoyl peroxide | 5.1 | 1043 | 4.8 | 2.4 | 0.51 |
| 23 | 6 mg benzoyl peroxide | 5.0 | 977 | 5.3 | 5.7 | 1.07 |

[1]Activity is measured as grams of polyethylene/mmol Zr/hour/100 psi (690 kPa) ethylene While the present invention has been described and illustrated by reference to particular embodiments, those of ordinary skill in the art will appreciate that the invention lends itself to variations not necessarily illustrated herein. For example, it is contemplated that different thermally triggered compounds, or a different combination of thermally triggered compounds may be used during the polymerization process depending on the product being produced. Also, two or more polymerization reactors, in series or parallel, slurry and/or gas phase may be used in which different combinations of thermally triggered compounds may be used. Furthermore, the thermally triggered compounds may be utilized downstream of the reactor to deactivate polymer withdrawn from a polymerization reactor. In addition, the thermally triggered compound may be used during the transition from one polymer grade to another. Also, two or more polymerization catalysts may be used with the thermally triggered compound of the invention. For this reason, then, reference should be made solely to the appended claims for purposes of determining the true scope of the present invention.

We claim:

1. A catalyst composition comprising a polymerization catalyst and a thermally triggered compound that at a specified temperature chemically transforms into one or more catalyst inhibitors that deactivate the catalyst composition.

2. The catalyst composition of claim 1 wherein the catalyst inhibitors are formed at a temperature different from the specified temperature.

3. The catalyst composition of claim 1 wherein the specified temperature is greater than a polymerization temperature.

4. The catalyst composition of claim 1 wherein the polymerization catalyst is supported.

5. The catalyst composition of claim 1 wherein the thermally triggered compound has a weight loss of greater than 5 weight percent at 100° C. measured using thermogravimetric analysis at 100° C. for 20 minutes.

6. The catalyst composition of claim 1 wherein the thermally triggered compound has a weight loss between greater than 5 weight percent at 100° C. and less than 0.02 weight percent at 80° C. as measured using thermogravimetric analysis at 80° C. for 20 minutes and 100° C. for 20 minutes.

7. The catalyst composition of claim 1 wherein at least one catalyst inhibitor is a gas or vapor.

8. The catalyst composition of claim 7 wherein the thermally triggered compound is a solid beta-keto acid.

9. The catalyst composition of claim 1 wherein two catalyst inhibitors are formed one being a gas or vapor and the other being a liquid.

10. The catalyst composition of claim 9 wherein one of the catalyst inhibitors is carbon dioxide and the other is a ketone.

11. A catalyst composition comprising a bulky ligand metallocene catalyst compound, an activator, a support, a thermally triggered compound, wherein thermally triggered compound is unreactive to the catalyst composition at 25° C.

12. The catalyst composition of claim 11 wherein if the catalyst composition is heated to greater than 80° C., the thermally triggered compound chemically transforms into at least one catalyst inhibitor.

13. The catalyst composition of claim 11 wherein the catalyst composition is heated by the heat of a polymerization process in excess of the operating temperature of the process.

\* \* \* \* \*